United States Patent [19]

Takata

[11] Patent Number: 5,197,808
[45] Date of Patent: Mar. 30, 1993

[54] DEVICE FOR MOUNTING ANNULAR BODY

[75] Inventor: Hirotoshi Takata, Kanagawa, Japan

[73] Assignee: NSK Ltd., Tokyo, Japan

[21] Appl. No.: 846,927

[22] Filed: Mar. 6, 1992

[30] Foreign Application Priority Data

Mar. 8, 1991 [JP] Japan .................................. 3-43372
Apr. 17, 1991 [JP] Japan .................................. 3-85174
Sep. 13, 1991 [JP] Japan .................................. 3-234845

[51] Int. Cl.⁵ ........................ F16C 19/15; F16C 43/04
[52] U.S. Cl. .................................... 384/493; 384/585
[58] Field of Search ............. 384/493, 535, 538, 557, 384/564, 581, 585

[56] References Cited

U.S. PATENT DOCUMENTS 4,895,462 1/1990 Takata ................................ 384/493
4,968,158 11/1990 Atkinson et al. ..................... 384/535

FOREIGN PATENT DOCUMENTS 61-252918 11/1986 Japan .
63-135023 9/1988 Japan .
1-307517 12/1989 Japan .
2-217613 8/1990 Japan .
2-253010 10/1990 Japan .
2-52123 11/1990 Japan .

Primary Examiner—Thomas R. Hannon
Attorney, Agent, or Firm—Sughrue, Mion, Zinn, Macpeak & Seas

[57] ABSTRACT

A mounting is provided to allow an applied load to be transmitted effectively by preventing an annular body of a bearing from being broken by a change in the temperature while the bearing is used if the linear expansion coefficient of the annular body and that of a mating member are different from each other. In a cylindrical roller bearing, having a ceramic inner ring (an annular body) 20 mounted onto a steel shaft (a mating member) 10, cylindrical portions 40b of a pair of spacers 40 are fitted onto an outer peripheral surface of the inner ring 20, the spacers 40 being firmly fitted onto the shaft 10. Each spacer 40 is made from a spring steel and is not only thin but also provided with a lightening portion 41 on its cylindrical portion 40, so that the spacers 40 support the inner ring 20 with respect to the shaft 10 elastically in the radical direction. Thermal stress and an increment of the interference caused on fitting surfaces 23, 43 of the inner ring 20 and the spacers 40, respectively, by a change in the temperature during the operation of the bearing are alleviated and absorbed by the elastic deformation of the cylindrical portions 40b of the spacers 40. As a result, a load applied to the inner ring 20 is transmitted to the shaft 10 through the spacers 40 without damaging the inner ring 20.

16 Claims, 4 Drawing Sheets

DEVICE FOR MOUNTING ANNULAR BODY

BACKGROUND OF THE INVENTION

The invention relates to a device for mounting an annular body, such as the inner ring or outer ring of a bearing, on a mating member when the linear expansion coefficient of the annular body is different from that of the mating member.

Conventionally, a paper on a structure for mounting a bearing such as a rolling bearing onto its mating member when the linear expansion coefficient of the bearing is different from that of the mating member is disclosed on pages 407 to 415 of "Lubrication Engineering" (July 1981).

As shown in FIG. 1, this rolling bearing includes an inner ring 2 mounted on a shaft 1, an outer ring 3 mounted on a not shown journal box, and caged cylindrical rollers 5 interposed between the inner ring 2 and the outer ring 3. The shaft 1 is made from a steel, and the inner ring 2 a ceramic. Both axial side end surfaces of the inner ring 2 are tapered so that the width of the inner ring 2 grows larger toward the outer periphery, and clearance-fitted onto the shaft 1. These side end surfaces of the inner ring 2 are clamped between a pair of steel spacers 4 that are close-fitted onto the shaft 1, and it is so designed that no excessive load is applied to the bearing by relative sliding between the inner ring 2 and the spacers 4 on these side end surfaces when the shaft 1 and the spacers 4 expand thermally.

In the above-mentioned rolling bearing, the load applied to the bearing is transmitted to the spacers 4 while amplified by the wedge action of these side end surfaces of the inner ring 2. As a result, the contact surface pressure over these side end surfaces is increased so much that they are worn, damaged, or even broken with the load reaching its upper limit. This disadvantageously limits the allowable maximum Further, when assembling the inner ring 2 and the spacers onto the shaft 1, relative slip occurs between the inner ring 2 that is clearance-fitted and the spacers 4 that are close-fitted, and this imposes difficulty in making a correct alignment. Thus, certain skill is required for the assembling work, which is a disadvantage from the viewpoint of operability.

Still further, that the side end surfaces of the inner ring 2 are tapered imposes technical difficulty in ensuring a required dimensional accuracy when machining the inner ring 2, and from this arises an additional disadvantage of elevated manufacturing cost.

SUMMARY OF THE INVENTION

An object of the invention is to overcome the above problems and therefore provide a mounting device which is hard to wear, damage, etc., and which allows easy and accurate mounting of an annular body onto its mating member during operation of the annular body whose linear expansion coefficient is different from that of the mating member.

To achieve the above object, a first aspect of the invention is applied to a mounting device in which an annular body, fitted onto an outer periphery or inner periphery of a mating member, has a linear expansion coefficient different from that of the mating member. The annular body is supported by cylindrical portions of a pair of spacers while fitted onto them over an outer peripheral surface which is opposite to its surface fitted onto the mating member and which is at its axial side end portions, the pair of spacers being firmly fitted with the outer periphery or inner periphery of the mating member. The spacer has a linear expansion coefficient different from that of the annular body and supports the annular body with respect to the mating member elastically in the radial direction.

To make the spacers elastically support the annular body, it is preferable that the cylindrical portion of each spacer be thin, that a lightening portion be provided at the bottom base end corner of the cylindrical portion, or that the spacer be made from a material easy to be deformed elastically such as a spring steel.

Axially extending slits may be formed over the surface of the cylindrical portion of each spacer fitted onto the annular body at a predetermined interval in the circumferential direction.

The annular body mounted on the mating member by this mounting device of the invention transmits a load applied thereto to the mating member through the spacers fitted onto the annular body.

Even if a thermal stress and an increment of the fitting margin are caused between the annular body and the mating member as the temperature of the annular body changes from the time it is mounted to the time it is being used, the elastic deformation of the cylindrical portions of the spacers alleviates the thermal stress and absorbs the increment of the fitting margin. As a result, the load applied to the annular body is transmitted to the mating member effectively through the spacers.

To further achieve the above object, a second aspect of the invention is applied to a mounting device in which an annular body, fitted onto an outer periphery or inner periphery of a mating member, has a linear expansion coefficient different from that of the mating member. The annular body is supported by cylindrical portions of a pair of spacers while fitted onto them over an outer peripheral surface which is opposite to its surface fitted onto the mating member and which is at its axial side end portions, the pair of spacers being firmly fitted with the outer periphery or inner periphery of the mating member. The spacer is made from a material whose linear expansion coefficient from a portion contacting the mating member to a portion contacting the annular body changes continuously or gradually in a radial direction common with radial directions in which the linear expansion coefficients of the mating member and the annular body change, respectively, and the spacers support the annular body with respect to the mating member elastically in the radial direction.

It is preferable to set the linear expansion coefficient of the portion of each spacer contacting the mating member to a value substantially equal to that of the mating member and to set the linear expansion coefficient of its portion contacting the annular body to a value substantially equal to that of the annular body.

As the material of the spacer whose linear expansion coefficient changes continuously, a composite material in which, e.g., a ceramic and a metal are mixed at different ratios is used. As the material of the spacer whose linear expansion coefficient changes gradually, a material in which, e.g., at least two materials whose linear expansion coefficients are different are laminated in the radial direction is used. The spacer may also be formed of a ceramic that is easy to be deformed elastically and a metal.

To make the spacers elastically support the annular body, it is preferable that the cylindrical portion of each spacer be thin, or that a lightening portion be provided at the bottom base end corner of the cylindrical portion. Axially extending slits may also be formed over the fitting surface between the cylindrical portion of each spacer and the annular body at a predetermined interval in the circumferential direction.

The annular body mounted on the mating member by this mounting device of the invention transmits a load applied thereto to the mating member through the spacers fitted onto the annular body.

Even if a thermal stress and an increment of the fitting margin are caused between the annular body and the mating member as the temperature of the annular body changes from the time the annular body is mounted to the time it is being used, the elastic deformation of the cylindrical portions of the spacers alleviates the thermal stress and absorbs the increment of the fitting margin. Further, since the linear expansion coefficient of the spacer changes in the radial direction, the sum of increments of the fitting margins of the spacers with respect to the mating member and the annular body with increments of their fitting margins with respect to the mating member and the annular body caused by an increment of the fitting margin between the mating member and the annular body can be absorbed by internal distortion of the spacers. As a result, the load applied to the annular body can be transmitted to the mating member through the spacers.

To further achieve the above object, a third aspect of the invention is applied to a device for mounting an annular body such as an inner ring, which is fitted onto an outer periphery or inner periphery of a mating member such as a shaft, and which has a linear expansion coefficient different from that of the mating member. In such a mounting device, a pair of first spacers and a pair of second spacers which respectively support axial side end portions of the annular body are provided.

Each first spacer includes: a cylindrical portion forming a peripheral surface fitted onto an outer peripheral surface of the annular body which is opposite to the peripheral surface fitted onto the mating member, the outer peripheral surface of the annular body being at an axial side end portion of the annular body; and an annular portion forming both an inner side end surface clamping the vertical side end surface of the annular body and an outer side end surface tapered so as to grow smaller or larger axially.

Each second spacer includes: a cylindrical portion forming a peripheral surface fitted onto the outer side end surface of the first spacer, the outer side end surface being opposite to the inner side end surface fitted onto the annular body; and an annular portion forming both an inner side end surface clamping the outer side end surface of the annular portion of the first spacer and a peripheral surface firmly engaged with the outer periphery or inner periphery of the mating member.

The first spacer is made from a material having a linear expansion coefficient that is equal or substantially equal to that of the annular body, while the second spacer is made from a material having a linear expansion coefficient that is equal or substantially equal to that of the mating member.

The annular body mounted on the mating member by the mounting device of the invention transmits a load applied thereto to the mating member through the first spacers and the second spacers.

With a change in temperature after the annular body has been mounted, the quantity of deformation produced by differences in linear expansion coefficient among the annular body, the first spacers, and the second spacers can be absorbed by relative slip over the tapered surface formed between each first spacer and each second spacer clamping such first spacer, thereby causing no excessive thermal stress nor any increment of the fitting margin.

DETAILED DESCRIPTION OF THE PREFERRED EMBODIMENTS

Figure 1:
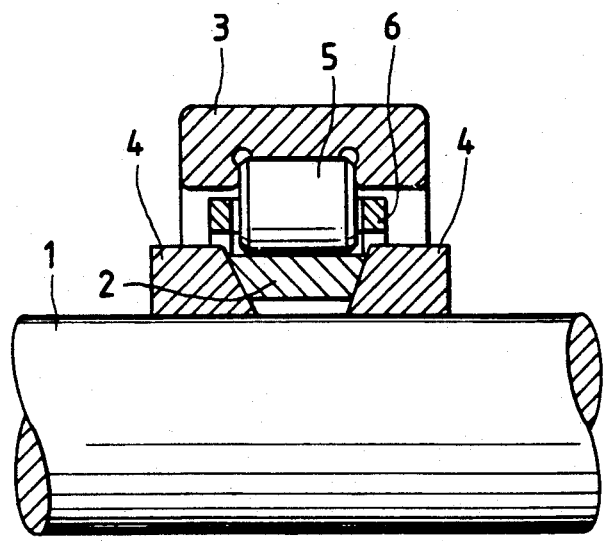
FIG. 1 is an upper half longitudinal sectional side view showing a conventional device for mounting a cylindrical roller bearing.

A first embodiment of the invention will be described with reference to the drawing.

Figure 2:
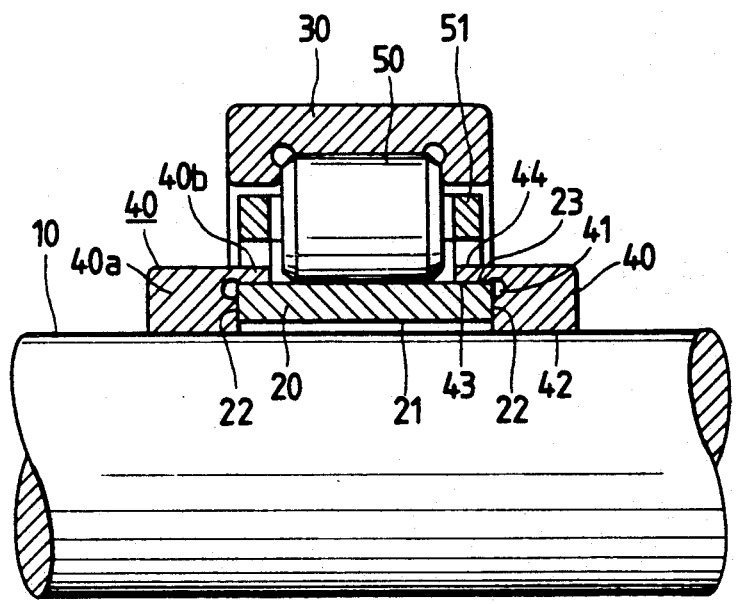
FIG. 2 is an upper half longitudinal sectional side view showing a first embodiment in which the invention is applied to a cylindrical roller bearing.

FIG. 2 shows the first embodiment in which the invention is applied to mounting an inner ring (an annular body) of a cylindrical roller bearing onto a shaft (a mating member). The cylindrical roller bearing shown in FIG. 2 includes an inner ring 20, an outer ring 30, and cylindrical rollers 50 placed by a cage 51 between the inner ring 20 and the outer ring 30.

An inner peripheral fitting surface 21 of the inner ring 20 is clearance-fitted onto a shaft 10, and the vertical surfaces formed on both axial side end surfaces 22 of the inner ring 20 are supported by clamping between a pair of spacers 40.

The side end surfaces 22 of the inner ring 20 and the surfaces of the spacers 40 confronting such surfaces 22 may be put in contact, or may also interpose an appropriate axially extending gap therebetween.

Each spacer 40 includes an annular portion 40a fitted onto the outer peripheral surface of the shaft 10 and a cylindrical portion 40b axially protruding from the annular portion 40a to be fitted onto an outer peripheral fitting surface 23 on the side end portion of the inner ring 20. The cylindrical portion 40b is thin in thickness and thus easy to be deformed elastically in the radial direction. In addition, the cylindrical portion 40b has a lightening portion 41 at the bottom base end corner of the cylindrical portion so that the cylindrical portion 40b can easily be deformed elastically. It may be only one of these structural features, the thinning or the lightening, that the cylindrical portion 40b is provided with. Axially extending slits (not shown) may also be formed at a predetermined interval in the circumferential direction over an inner peripheral surface 43 of the cylindrical portion 40b of each spacer 40.

An inner peripheral surface 42 of the annular portion 40a of each spacer 40 is firmly engaged with the shaft 10 by close fitting, bonding, welding, or screwing, etc., and the inner peripheral surface 43 of the cylindrical portion 40b is close-fitted onto the inner ring 20, so that the spacers 40 support the side end portions of the inner ring 20 elastically in the radial direction with respect to the shaft 10.

The inner ring 20 of the above-mentioned cylindrical roller bearing is made from a ceramic such as silicon nitride, and the shaft 10 from a steel. The outer ring 30 and the cylindrical roller 50 are made from bearing steels. The spacers 40 are generally made from a steel, particularly preferably from a spring steel, but other elastically deformable materials may also be employed.

Let us now think about a case in which the temperature of the thus constructed bearing gets higher when the bearing is used than when it is mounted. The linear expansion coefficient $a_j$ of silicon nitride that forms the inner ring 20 is smaller than the linear expansion coefficient $a_k$ of the spring steel that forms the spacer 40, and the inner ring 20 is clearance-fitted onto the shaft 10, while the spacers 40 are close-fitted onto the shaft 10 and the inner ring 20 at the time of mounting. Therefore, as the temperature increases, the interference between the outer peripheral fitting surface 23 of the inner ring 20 and the inner peripheral surface 43 of the cylindrical portion 40b of each spacer 40 must decrease compared with the interference at the time of mounting. On the other hand, since the cylindrical portions 40b of the spacers 40 support the inner ring 20 elastically in the axial direction, major part of such decrease in the interference is to be absorbed by the expansion of the cylindrical portions 40b in the radial direction (elastic deformation). Particularly, when the spacer 40 is made from a spring steel such as in this embodiment, a larger portion of such decrease in the interference can be absorbed in advance by the elastic deformation of the cylindrical portions 40b.

As a result, an increment of the fitting stress including a thermal stress caused between the inner ring 20 and the spacers 40 before and after the temperature increase is reduced compared with a case in which there is no such noticeable elastic deformation of the cylindrical portions 40b as in the above case, with the fitting stress remaining substantially unchanged even after the bearing is mounted, and it is for this reason that the inner ring 20 can in no way be broken due to increase in the thermal stress associated with a change in temperature.

Further, when a load is applied to the thus mounted bearing, a load applied to the shaft 10 is transmitted to the inner ring 20 through the cylindrical portions 40b of the spacers 40. However, since the cylindrical portions 40b of the spacers 40 transmit the load while deforming themselves elastically, the inner ring 20 is to be in no way broken. Therefore, the bearing can transmit the load effectively.

In the above embodiment, the dimensions of the inner peripheral fitting surface 21 and the outer peripheral fitting surface 23 of the inner ring 20 may be designed so that the fitting surfaces 21 and 23 of the inner ring 20 are firmly fitted onto the shaft 10 and the spacers 40, respectively, when the bearing is used at the latest, and so that the maximum tensile stress on the inner peripheral fitting surface 21 of the inner ring 20 and the maximum compression stress on its outer peripheral fitting surface 23 become smaller than the corresponding allowable maximum stresses of a material forming the inner ring 20.

With the bearing constructed as described above, part of a load applied to the bearing is transmitted to the shaft 10 not only through the spacers 40 but also through the inner peripheral fitting surface 21 of the inner ring 20. As a result, a load borne by the spacers 40 can be reduced, which reduces stress applied to the outer peripheral fitting surface 23 of the inner ring 20 and thereby surely prevents the inner ring 20 from being broken by the applied load.

Since the surface of an end portion 44 of the cylindrical portion 40b of each spacer 40 confronts an end surface of the cylindrical roller 50 in close proximity in this cylindrical roller bearing, the end portion 44 serves also as a guide collar for the cylindrical roller 50. In addition, since the outer peripheral surface of the end portion 44 confronts the inner peripheral surface of the cage 51 in close proximity, the end portion 44 serves also as a guide ring for the cage 51. It may be so designed that only one of these functions is performed.

Figure 3:
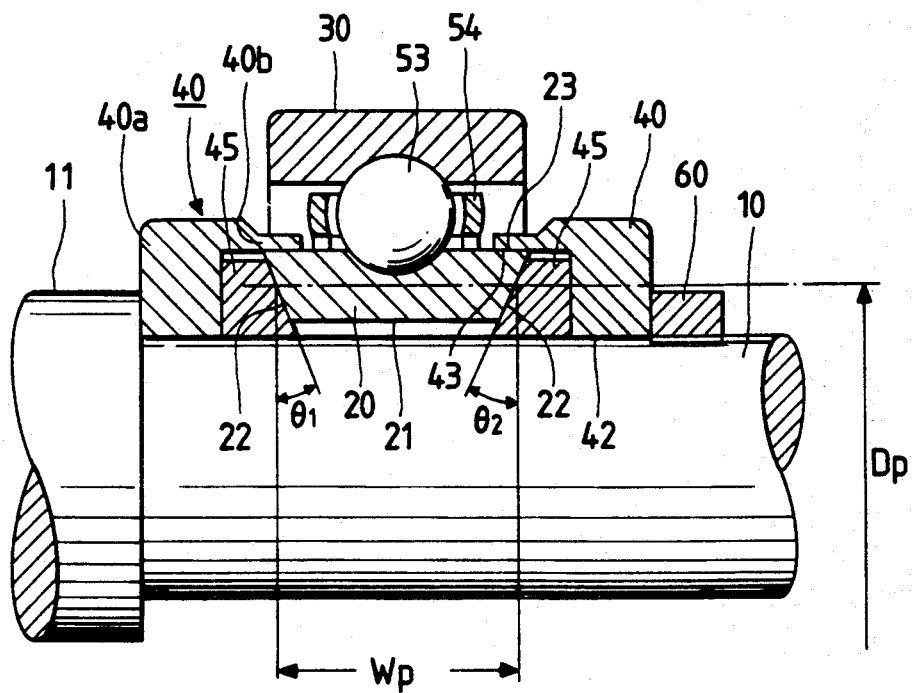
FIG. 3 is an upper half longitudinal sectional side view showing a second embodiment in which the invention is applied to a ball bearing.

FIG. 3 shows a second embodiment in which the invention is applied to mounting an inner ring (an annular body) of a ball bearing onto a shaft (a mating member). In FIG. 3, the ball bearing includes an inner ring 20, an outer ring 30, and balls 53 placed by a cage 54 between the outer ring 30 and the inner ring 20. An inner peripheral fitting surface 21 of the inner ring 20 is clearance-fitted onto a shaft 10, and a pair of spacers 40 are close-fitted onto an outer peripheral fitting surface 23 of each of both axial side end portions of the inner ring 20. The spacers 40 are firmly engaged with the shaft 10 by a nut 60 screwed into a shoulder portion 11 and the shaft 10. Both side end surfaces 22 of the inner ring 20 are tapered so that the width of the inner ring 20 grows larger toward the outer periphery, and a pair of intermediate spacers 45 confronting the side end surfaces 22 at the same angles of inclination are interposed between the inner ring 20 and the spacers 40, respectively, while firmly engaged with the shaft 10. The spacers 40 clamp the inner ring 20 through the intermediate spacers 45. Each spacer 40 of this embodiment is thin only at the end portion of its cylindrical portion 40b with the lightening portion shown in FIG. 2 omitted.

The shaft 10, the inner ring 20, the outer ring 30, the balls 53, and the spacer 40 constituting this bearing are made from the same materials as the bearing shown in FIG. 2. The intermediate spacer 45 is made from a material whose linear expansion coefficient is the same as that of the shaft 10.

While the construction that the spacers 40 of the thus constructed ball bearing support the inner ring 20 with respect to the shaft 10 elastically in the radial direction is the same as in FIG. 2, a load applied to the bearing is not only borne by the spacers 40 through the outer peripheral fitting surface 23 of the inner ring 20, but also borne by the intermediate spacers 45 through the side end surfaces 22 of the inner ring 20 and transmitted to the shaft 10. Therefore, the load borne by the cylindrical portions 40b can be reduced compared with the case in which the load is borne only by the spacers 40.

Therefore, according to this embodiment, the cylindrical portions 40b of the spacers 40 are in no way subjected to excessive elastic deformation, thereby allowing the cylindrical portions 40b to be further thinned within the limit of the allowable stress determined by the material of the spacers 40. In addition, the thermal stress to the outer peripheral fitting surface 23 of the inner ring 20 can be reduced significantly.

Likewise in this embodiment, the dimensions of the fitting surfaces 21, 23 may be so selected that the inner peripheral fitting surface 21 and the outer peripheral fitting surface 23 of the inner ring 20 are fitted firmly with the shaft 10 and the spacers 40, respectively, when the bearing is used at the latest and that the maximum tensile stress and the maximum compression stress of the inner ring 20 are reduced compared with the corresponding allowable maximum stresses of the material forming the inner ring 20. In such a case, a load applied to the bearing can be transmitted to the shaft 10 also through the inner peripheral fitting surface 21 of the inner ring 20, so that a load borne by the spacers 40 and the intermediate spacer 45 can be further reduced. This further reduces the stress in the outer peripheral fitting surface 23 of the inner ring 20, thus ensuring that breakage of the inner ring 20 will be prevented.

Further, in this embodiment, the angles and dimensions of the inner ring 20 can be set so that the following equation (1) can be established among its angles of inclination $\theta_1$, $\theta_2$ formed with respect to the vertical sections of its axial side end surfaces 22, its axial length $W_p$ at the center of its thickness, and its diameter $D_p$.

$$\tan\theta_1 + \tan\theta_2 = 2W_p/D_p \tag{1}$$

where $\theta_1$, $\theta_2$ take positive values when the axial side end surfaces of the inner ring 20 extend so that the width of the inner ring 20 grows larger toward the outer periphery and negative values when they extend so that the width of the inner ring 20 grows less toward the outer periphery.

By setting the angles and dimensions as described above, even if the linear expansion coefficient of the inner ring 20 is different from that of the shaft 10, differences between an axial displacement of the inner ring 20 and its radial displacement associated with a change in the temperature of the bearing between the time the bearing is used and the time it is mounted can be canceled out, thereby allowing the influence from thermal stress caused on the contact surfaces between the inner ring 20 and the intermediate spacers 45 as well as on the fitting surface between the inner ring 20 and the shaft 10 to be surely eliminated.

The above equation (1) can be calculated as follows.

Assuming that axial and radial displacements on the axial side end surfaces 22 of the inner ring 20 caused by an increment of temperature $\Delta T$ are $\Delta x_1$, $\Delta x_2$, and $\Delta y_1$, $\Delta y_2$, respectively, then $$\Delta x_1 = (\alpha_s - \alpha_j) \cdot \Delta T \cdot (W_p - D_p \tan\theta_1)/2 \tag{2a}$$

$$\Delta x_2 = (\alpha_s - \alpha_j) \cdot \Delta T \cdot (W_p - D_p \tan\theta_2)/2 \tag{2b}$$

$$\Delta y_1 = (\alpha_s - \alpha_j) \cdot \Delta T \cdot (D_p - W_p \tan\theta_1)/2 \tag{3a}$$

$$\Delta y_2 = (\alpha_s - \alpha_j) \cdot \Delta T \cdot (D_p - W_p \tan\theta_2)/2 \tag{3b}$$

where $\alpha_x$, $\alpha_j$ are the linear expansion coefficient of the shaft 10 and that of the inner ring 20 and the first spacer 50, respectively. Hence, as a condition that there are no differences between the temperature change-induced axial displacements and between the temperature change-induced radial displacements in the inner ring 20, $$\Delta x_1 + \Delta x_2 = 0 \tag{4a}$$

$$\Delta y_1 + \Delta y_2 = 0 \tag{4b}$$

can be set, and with $\alpha_x = \alpha_j$, $\Delta T = 0$, equations (2a), (2b), (3a), (3b), (4a), (4b) can be solved to obtain equation (1).

The intermediate spacer 45 in this embodiment may clamp only a single side end surface of the inner ring 20.

In addition to the shown manner, the intermediate spacers 45 may be mounted in the following way, which involves the steps of firmly engaging the intermediate spacers 45 with the shaft 10 and then firmly engaging the spacers 40 onto the outside surfaces of the intermediate spacers 45 by close fitting. Or a body integrating the intermediate spacer 45 and the spacer 40 by bonding may be used, or such body formed monolithically may also be used.

While the case in which the ceramic inner ring is mounted onto the steel shaft has been described in the above embodiments, the invention is applied not only to the above case, but also similarly to, e.g., a case in which a steel inner ring is mounted onto a shaft made from such a material as a stainless steel, brass, and an aluminum alloy.

Further, the invention is applied not only to the bearing whose inner ring and shaft have different linear expansion coefficients, but also to a bearing whose outer ring and journal box have different linear expansion coefficients.

Still further, the invention is applied not only to the case in which the temperature of a bearing gets higher when the bearing is used than when it is mounted; but also to a case in which the temperature gets lower when the bearing is used than when it is mounted.

Still further, the invention is applied to mounting annular bodies, which are components of not only roller bearings but also slide bearings and other devices onto mating members whose linear expansion coefficients are different.

As described above, according to the invention, a load applied to the annular body can be transmitted to the mating member through the spacers that are fitted onto the annular body when the linear expansion coefficient of the mating member is different from that of the annular body fitted with the mating member. And even if a thermal stress and an increment of the interference are caused between the annular body and the spacers due to change in the temperature of the annular body between the time the annular body is mounted and the time it is used, the cylindrical portions of the spacers fitted onto the annular body support the annular body with respect to the mating member elastically in the radial direction. As a result, the thermal stress or the increment of the interference can be alleviated or absorbed, hence allowing the load to be transmitted effectively without breaking the annular body.

Still further, according to the invention, the interference of the annular body with respect to its mating member can also be reduced, so that the annular body and its mating member can be aligned easily while they are being mounted. In addition, the coaxial state of the annular body with respect to its mating member can be maintained accurately during their operation, so that a high performance of the mounted device can be maintained and the mounting device with a high reliability can thus be obtained.

A third embodiment of the invention will be described with reference to the drawing.

Figure 4:
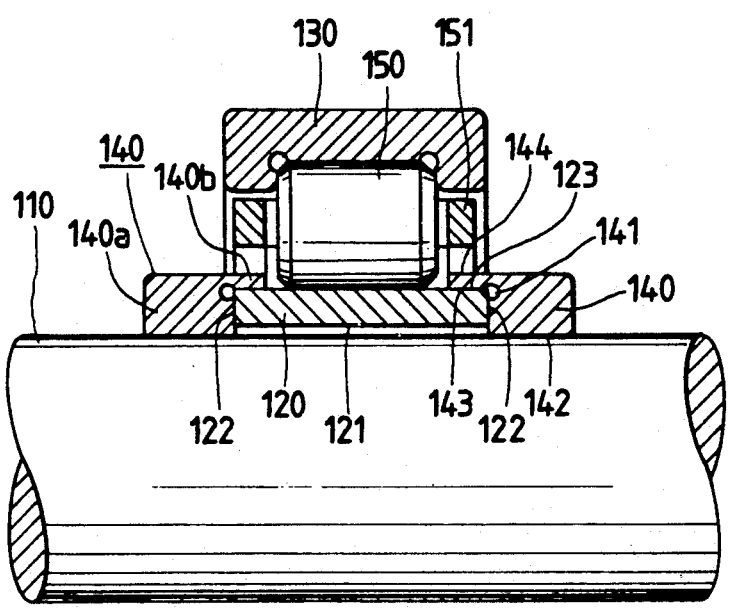
FIG. 4 is an upper half longitudinal sectional side view showing a third embodiment in which the invention is applied to a cylindrical roller bearing.

FIG. 4 shows the third embodiment in which the invention is applied to mounting an inner ring (an annular body) of a cylindrical roller bearing onto a shaft (a mating member). The cylindrical roller bearing shown in FIG. 4 includes an inner ring 120, an outer ring 130, and cylindrical rollers 150 placed by a cage 151 between the inner ring 120 and the outer ring 130.

An inner peripheral fitting surface 121 of the inner ring 120 is clearance-fitted onto a shaft 110, and the Vertical surfaces formed on both axial side end surfaces 122 of the inner ring 120 are supported by clamping between a pair of spacers 140.

The side end surfaces 122 of the inner ring 120 and the surfaces of the spacers 140 confronting such surfaces 122 may be put in contact, or may also interpose an appropriate axially extending gap therebetween.

The inner ring 120 of the above-mentioned cylindrical roller bearing is made from a ceramic such as silicon nitride, and the shaft 110 from a steel. The outer ring 130 and the cylindrical roller 150 are made from bearing steels.

Each spacer 140 includes an annular portion 140a fitted onto the outer peripheral surface of the shaft 110 and a cylindrical portion 140b axially protruding from the annular portion 140a to be fitted onto an outer peripheral fitting surface 123 on the side end portion of the inner ring 120. An inner peripheral surface 142 of the annular portion 140a of each spacer 140 is firmly engaged with the shaft 110 by close fitting, bonding, welding, or screwing, etc., and the inner peripheral surface 143 of the cylindrical portion 140b is close-fitted onto the inner ring 120, so that the spacers 140 support the side end portions of the inner ring 120 elastically in the radial direction with respect to the shaft 110.

The cylindrical portion 140b is thin in thickness and thus easy to be deformed elastically in the radial direction. In addition, the cylindrical portion 140b has a lightening portion 141 at the bottom base end corner of the cylindrical portion so that the cylindrical portion 140b can easily be deformed elastically. It may be only one of these structural features, the thinning or the lightening, that the cylindrical portion 140b is provided with. Axially extending slits (not shown) may also be formed at a predetermined interval in the circumferential direction over an inner peripheral surface 143 of the cylindrical portion 140b of each spacer 140.

The spacer 140 in the third embodiment is made from a material whose linear expansion coefficient in the radial direction from the inner peripheral portion that is in contact with the shaft 110 toward the outer peripheral portion changes in a radial direction common with radial directions in which a linear expansion coefficient $\alpha_s$ of the shaft 110 and a linear expansion coefficient $\alpha_j$ of the inner ring 120 change, respectively.

The linear expansion coefficient of the material forming the spacer 140 is not limited to one that changes continuously in the radial direction, but may include one that changes step by step in the radial direction as well. The material whose linear expansion coefficient changes continuously may include a composite material (an inclinational material) in which, e.g., a ceramic and a metal are mixed at different ratios in the radial direction. The material whose linear expansion coefficient changes step by step may include a laminated material in which at least two materials whose linear expansion coefficients are different are laminated in the radial direction by fitting, bonding, or the like.

When forming the spacer 140 using the above-mentioned materials, it is preferable that the linear expansion coefficient of an inner peripheral portion including the inner peripheral surface 142 of the annular portion 140a of each spacer 140 be so set as to be substantially equal to the linear expansion coefficient $\alpha_s$ of the shaft 110 and that the linear expansion coefficient of an outer peripheral portion including the inner peripheral surface 143 of the cylindrical portion 140b of each spacer 140 be so set as to be substantially equal to the linear expansion coefficient $\alpha_j$ of the inner ring 120, while that the linear expansion coefficient of an intermediate portion from the inner peripheral portion to the outer peripheral portion of each spacer 140 be so set as to decrease either continuously or step by step.

Further, the material of the spacer 140 may also include a characteristic of being easy to be deformed elastically in addition to the characteristics referred to above. For example, zirconia as a ceramic and a spring steel as a metal may be employed.

Let us now think about a load transmission mechanism among the shaft 110, the inner ring 120, and the spacers 140 in the case in which the temperature of the thus formed bearing becomes higher when the bearing is used than when it is mounted. As the temperature increases, the interference of the inner peripheral surface 143 of the cylindrical portion 140b of each spacer 140 with respect to the outer peripheral fitting surface 123 of the inner ring 120 is changed. However, even with such change in the interference, the cylindrical portions 140b of the spacers 140 continue to support the inner ring 120 with respect to the shaft 110 elastically in the radial direction, so that the majority of the increment of the interference is absorbed by the elastic deformation (expansion) of the cylindrical portions 140b of the spacers 140 in the radial direction. Particularly, when the spacer 140 is made from a material easy to be deformed elastically, a larger portion of the above-mentioned increment of the interference can be absorbed in advance by the elastic deformation of the cylindrical portions 140b of the spacers 140.

Further, as the temperature of the bearing increases when the bearing is being operated, the interferences of the inner peripheral surfaces 142, 143 of the annular portion 140a and the cylindrical portion 140b of each spacer 140 with respect to the shaft 110 and the inner ring 120, respectively, change to bring about increments, and even if such increments are summed up with increments of the interferences of each spacer 140 with respect to the shaft 110 and the inner ring 120 associated with an increment of the interference caused between the inner ring 120 and the shaft 110, the linear expansion coefficient of the spacer 140, exhibiting the characteristic of changing in the radial direction, can have the sum of the increments of the interferences absorbed by internal distortion of the spacers 140, thus allowing the sum to be made close to zero.

As a result, the increment of the fitting stress including a thermal stress caused between the inner ring 120 and the spacers 140 as well as the increments of the interferences caused among the spacers 140, the shaft 110, and the inner ring 120 before and after the temperature rise are reduced compared with a case in which there is no such noticeable elastic deformation of the cylindrical portions 140b and/or a case in which there is no such directional characteristic of the linear expansion coefficient of the spacers 140 as above, with both such increments remaining substantially unchanged compared with the time the bearing is mounted. This is why the inner ring 120 is in no way broken by the increase in the thermal stress resulting from a change in temperature.

Further, when a load is applied to the thus mounted bearing, a load applied to the shaft 110 is transmitted to the inner ring 120 through the cylindrical portions 140b of the spacers 140. However, since the cylindrical portions 140b of the spacers 140 transmit the load while deforming themselves elastically, the inner ring 120 is to be in no way broken. Therefore, the bearing can transmit the load effectively.

In the above embodiment, the dimensions of the inner peripheral fitting surface 121 and the outer peripheral fitting surface 123 of the inner ring 120 may be designed so that the fitting surfaces 121 and 123 of the inner ring 120 are firmly fitted onto the shaft 110 and the spacers 140, respectively, when the bearing is used at the latest, and so that the maximum tensile stress on the inner peripheral fitting surface 121 of the inner ring 120 and the maximum compression stress on its outer peripheral fitting surface 123 become smaller than the corresponding allowable maximum stresses of a material forming the inner ring 120.

With the bearing constructed as described above, part of a load applied to the bearing is transmitted to the shaft 110 not only through the spacers 140 but also through the inner peripheral fitting surface 121 of the inner ring 120. As a result, a load borne by the spacers 140 can be reduced, which reduces stress applied to the outer peripheral fitting surface 123 of the inner ring 120 and thereby surely prevents the inner ring 120 from being broken by the applied load.

Since the surface of an end portion 144 of the cylindrical portion 140b of each spacer 140 confronts an end surface of the cylindrical roller 150 in close proximity in this cylindrical roller bearing, the end portion 144 serves also as a guide collar for the cylindrical roller 150. In addition, since the outer peripheral surface of the end portion 144 confronts the inner peripheral surface of the cage 151 in close proximity, the end portion 144 serves also as a guide ring for the cage 151. It may be so designed that only one of these functions is performed.

Figure 5:
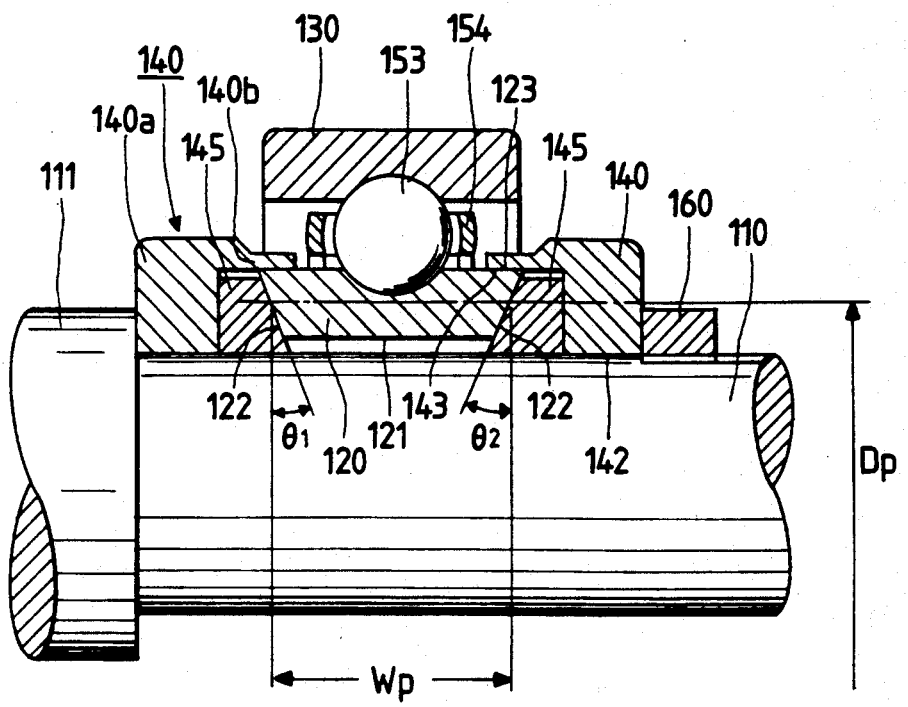
FIG. 5 is an upper half longitudinal sectional side view showing a fourth embodiment in which the invention is applied to a ball bearing.

FIG. 5 shows a fourth embodiment in which the invention is applied to mounting an inner ring (an annular body) of a ball bearing onto a shaft (a mating member). In FIG. 5, the ball bearing includes an inner ring 120, an outer ring 130, and balls 153 placed by a cage 154 between the outer ring 130 and the inner ring 120. An inner peripheral fitting surface 121 of the inner ring 120 is clearance-fitted onto a shaft 110, and a pair of spacers 140 are close-fitted onto an outer peripheral fitting surface 123 of each of both axial side end portions of the inner ring 120. The spacers 140 are firmly engaged with the shaft 110 by a nut 160 screwed into a shoulder portion 111 and the shaft 110. Both side end surfaces 122 of the inner ring 120 are tapered so that the width of the inner ring 120 grows larger toward the outer periphery, and a pair of intermediate spacers 145 confronting the side end surfaces 122 at the same angles of inclination are interposed between the inner ring 120 and the spacers 140, respectively, while firmly engaged with the shaft 110. The spacers 140 clamp the inner ring 120 through the intermediate spacers 145. Each spacer 140 of this embodiment is thin only at the end portion of its cylindrical portion 140b with the lightening portion shown in FIG. 4 omitted.

The shaft 110, the inner ring 120, the outer ring 130, the balls 153, and the spacer 140 constituting this bearing are made from the same materials as the bearing shown in FIG. 4. The intermediate spacer 145 is made from a material whose linear expansion coefficient is the same as that of the shaft 110.

While the construction that the spacers 140 of the thus constructed ball bearing support the inner ring 120 with respect to the shaft 110 elastically in the radial direction is the same as in FIG. 4, a load applied to the bearing is not only borne by the spacers 140 through the outer peripheral fitting surface 123 of the inner ring 120, but also borne by the intermediate spacers 145 through the side end surfaces 122 of the inner ring 120 and transmitted to the shaft 110. Therefore, the load borne by the cylindrical portions 140b can be reduced compared with the case in which the load is borne only by the spacers 140.

Therefore, according to this embodiment, the cylindrical portions 140b of the spacers 140 are in no way subjected to excessive elastic deformation, thereby allowing the cylindrical portions 140b to be further thinned within the limit of the allowable stress determined by the material of the spacers 140. In addition, the thermal stress to the outer peripheral fitting surface 123 of the inner ring 120 can be reduced significantly.

Likewise in this embodiment, the dimensions of the fitting surfaces 121, 123 may be so selected that the inner peripheral fitting surface 121 and the outer peripheral fitting surface 123 of the inner ring 120 are fitted firmly with the shaft 110 and the spacers 140, respectively, when the bearing is used at the latest and that the maximum tensile stress and the maximum compression stress of the inner ring 120 are reduced compared with the corresponding allowable maximum stresses of the material forming the inner ring 120. In such a case, a load applied to the bearing can be transmitted to the shaft 110 also through the inner peripheral fitting surface 121 of the inner ring 120, so that a load borne by the spacers 140 and the intermediate spacer 145 can be further reduced. This further reduces the stress in the outer peripheral fitting surface 123 of the inner ring 120, thus ensuring that breakage of the inner ring 120 will be prevented.

Further, in this embodiment, the angles and dimensions of the inner ring 120 can be set so that the following equation (1) can be established among its angles of inclination $\theta_1$, $\theta_2$ formed with respect to the vertical sections of its axial side end surfaces 122, its axial length $W_p$ at the center of its thickness, and its diameter $D_p$.

$$tan\theta_1 + tan\theta_2 = 2W_p/D_p \qquad (1)$$

where $\theta_1$, $\theta_2$ take positive values when the axial side end surfaces of the inner ring 120 extend so that the width of the inner ring 120 grows larger toward the outer periphery and negative values when they extend so that the width of the inner ring 120 grows less toward the outer periphery.

By setting the angels and dimensions as described above, even if the linear expansion coefficient of the inner ring 120 is different from that of the shaft 110, differences between an axial displacement of the inner ring 120 and its radial displacement associated with a change in the temperature of the bearing between the time the bearing is used and the time it is mounted can be canceled out, thereby allowing the influence from thermal stress caused on the contact surfaces between the inner ring 120 and the intermediate spacers 145 as well as on the fitting surface between the inner ring 120 and the shaft 110 to be surely eliminated.

The above equation (1) can be calculated as follows.

Assuming that axial and radial displacements on the axial side end surfaces 122 of the inner ring 120 caused by an increment of temperature $\Delta T$ are $\Delta x_1$, $\Delta x_2$, and $\Delta y_1$, $\Delta y_2$, respectively, then $$\Delta x_1 = (\alpha_s - \alpha_j) \cdot \Delta T \cdot (W_p - D_p \tan\theta_1)/2 \quad (2a)$$

$$\Delta x_2 = (\alpha_s - \alpha_j) \cdot \Delta T \cdot (W_p - D_p \tan\theta_2)/2 \quad (2b)$$

$$\Delta y_1 = (\alpha_s - \alpha_j) \cdot \Delta T \cdot (D_p - W_p \tan\theta_1)/2 \quad (3a)$$

$$\Delta y_2 = (\alpha_s - \alpha_j) \cdot \Delta T \cdot (D_p - W_p \tan\theta_2)/2 \quad (3b)$$

where $\alpha_s$, $\alpha_j$ are the linear expansion coefficient of the shaft 110 and that of the inner ring 120 and the first spacer 150, respectively. Hence, as a condition that there are no differences between the temperature change-induced axial displacements and between the temperature change-induced radial displacements in the inner ring 120, $$\Delta x_1 + \Delta x_2 = 0 \quad (4a)$$

$$\Delta y_1 + \Delta y_2 = 0 \quad (4b)$$

can be set, and with $\alpha_s = \alpha_j$, $\Delta T = 0$, equations (2a), (2b), (3a), (3b), (4a), (4b) can be solved to obtain equation (1).

The intermediate spacer 145 in this embodiment may clamp only a single side end surface of the inner ring 120.

In addition to the shown manner, the intermediate spacers 145 may be mounted in the following way, which involves the steps of firmly engaging the intermediate spacers 145 with the shaft 110 and then firmly engaging the spacers 140 onto the outside surfaces of the intermediate spacers 145 by close fitting. Or a body integrating the intermediate spacer 145 and the spacer 140 by bonding may be used, or such body formed monolithically may also be used.

While the case in which the ceramic inner ring is mounted onto the steel shaft has been described in the above embodiments, the invention is applied not only to the above case, but also similarly to, e.g., a case in which a steel inner ring is mounted onto a shaft made from such a material as a stainless steel, brass, and an aluminum alloy.

Further, the invention is applied not only to the bearing whose inner ring and shaft have different linear expansion coefficients, but also to a bearing whose outer ring and journal box have different linear expansion coefficients.

Still further, the invention is applied not only to the case in which the temperature of a bearing gets higher when the bearing is used than when it is mounted; but also to a case in which the temperature gets lower when the bearing is used than when it is mounted.

Still further, the invention is applied to mounting annular bodies, which are components of not only roller bearings but also slide bearings and other devices onto mating members whose linear expansion coefficients are different.

As described above, according to the invention, a load applied to the annular body can be transmitted to the mating member through the spacers that are fitted onto the annular body when the linear expansion coefficient of the mating member is different from that of the annular body fitted with the mating member. And even if a thermal stress and an increment of the interference are caused between the annular body and the spacers due to change in the temperature of the annular body between the time the annular body is mounted and the time it is used, the cylindrical portions of the spacers fitted onto the annular body support the annular body with respect to the mating member elastically in the radial direction. As a result, the thermal stress or the increment of the interference can be alleviated or absorbed, hence allowing the load to be transmitted effectively without breaking the annular body.

Further, according to the invention, even if increments are produced in the interference of the spacers with respect to the mating member and the annular body or in the interference of the annular body with respect to its mating member consequent to a change in temperature, such increments can be absorbed by internal distortion of the spacers whose linear expansion coefficient changes in the radial direction, thereby allowing the load to be transmitted effectively without breaking the annular body.

Still further, according to the invention, the interference of the annular body with respect to its mating member can also be reduced, so that the annular body and its mating member can be aligned easily while they are being mounted. In addition, the coaxial state of the annular body with respect to its mating member can be maintained accurately during their operation, so that a high performance of the mounted device can be maintained and the mounting device with a high reliability can thus be obtained.

A fifth embodiment of the invention will be described with reference to the drawing.

Figure 6:
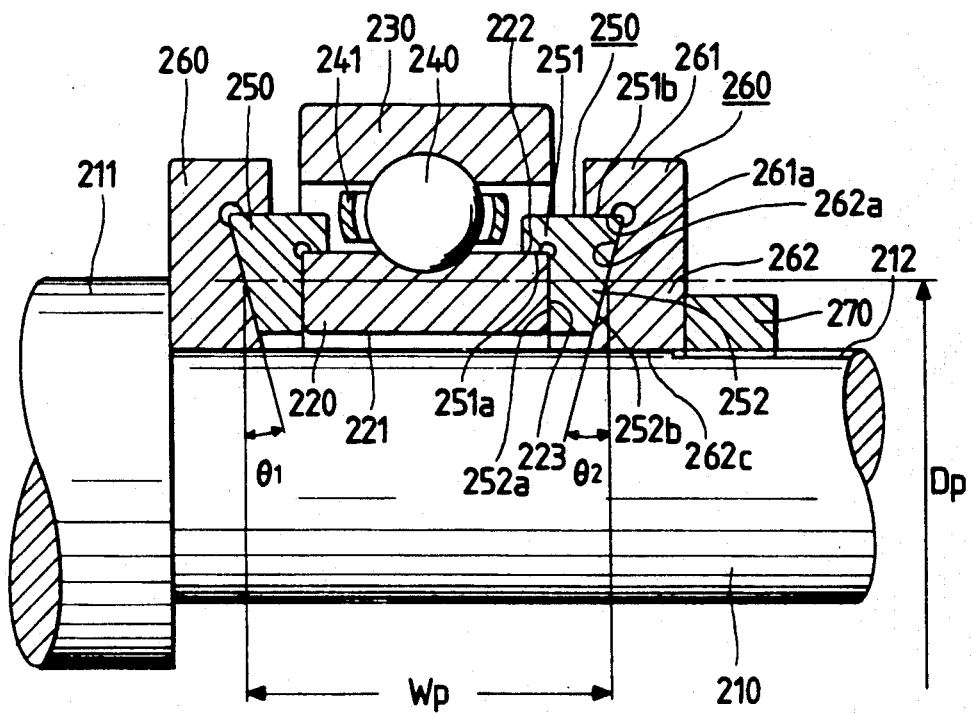
FIG. 6 is an upper half longitudinal sectional side view showing a fifth embodiment in which the invention is applied to a ball bearing.

FIG. 6 shows the fifth embodiment in which the invention is applied to mounting an inner ring (an annular body) of a ball bearing and a shaft (a mating member). In FIG. 6, the ball bearing includes an inner ring 220, an outer ring 230, and balls 240 placed by a cage 241 between the outer ring 230 and the inner ring 220.

An inner peripheral surface 221 of the inner ring 220 is clearance-fitted onto a shaft 210, and both axial side end portions of the inner ring 220 are axially positioned and radially supported by a pair of second spacers 260 through a pair of first spacers 250, respectively.

Each first spacer 250 includes a cylindrical portion 251 having an inner peripheral surface 251a fitted onto an outer peripheral surface 222 of the inner ring 220 and an annular portion 252 having both an axial inner side end surface 252a clamping a vertical side end surface 223 of the inner ring 220 and an axial outer side end surface 252b that is tapered so as to grow larger axially. The size of the inner peripheral surface of the annular portion 252 is substantially the same as the bore of the inner ring 220.

Each second spacer 260 includes a cylindrical portion 261 having an inner peripheral surface 261a fitted onto an outer peripheral surface 251b of the cylindrical portion 251 on the axial outer side of the first spacer 250, and an annular portion 262 having both a tapered axial inner side end surface 262a clamping the axial outer side end surface 252b of the annular portion 252 of the first spacer 250 and an inner peripheral surface 262c fitted onto the outer peripheral surface of the shaft 210.

The inner peripheral surface 251a of the cylindrical portion 251 of each first spacer 250 is fitted onto the outer peripheral surface 222 of the inner ring 220 that is fitted onto the shaft 210 with an appropriate fitting margin, while the axial inner side end surface 252a of the annular portion 252 of each first spacer 250 clamps the axial outer side end surface 223 of the inner ring 220 by abutment. Each second spacer 260 is firmly fitted onto the shaft 210 on the inner peripheral surface 262c of its annular portion 262 with an appropriate fitting margin, while the inner peripheral surface 261a of its cylindrical portion 261 is fitted onto the outer peripheral surface 251b on the axial outer side of the cylindrical portion 251 of each first spacer 250 with an appropriate fitting margin, with the inner side end surface 262a of its annular portion 262 clamping the outer side end surface of the annular portion 252 of the first spacer 250 by abutment. The second spacers 260 assembled onto the inner ring 220 through the first spacers 250 in this way are clamped between a shoulder portion 211 and a nut 270 screwed into a screw portion 212 of the shaft 210 and engaged with the shaft 210 firmly.

The first spacer 250 is made from a material whose linear expansion coefficient is equal or substantially equal to that of the inner ring 220, while the second spacer 260 is made from a material whose linear expansion coefficient is equal or substantially equal to that of the shaft 210. For example, a ceramic such as silicon nitride may be employed for the inner ring 220 and the first spacer 260, while a steel may be employed for the shaft 210 and the second spacer 260. The outer ring 230 and the balls 240 of the ball bearing may be made from, e.g., an ordinary bearing steel.

As means for firmly engaging the second spacers 260 with the shaft 210, close fitting, bonding, welding, etc. may be employed in addition to the means employed in the above embodiment.

Now, let us think about a case where the temperature of the bearing gets higher when the bearing is used than it is mounted. With a rise in the temperature, the inner ring 220 and the first spacers 250, as well as the shaft 210 and the second spacers 260, whose linear expansion coefficients are equal or substantially equal to each other displace substantially integrally, respectively. Displacements brought about by the difference in the linear expansion coefficient between the inner ring 220 and the first spacers 250 as well as between the shaft 210 and the second spacers 260, and displacements brought about by the thermal stress caused between the first spacers 250 and the second spacers 260 are absorbed or released by relative slip over the clamping surface over which the outer side end surface 252b of the annular portion 252 of each first spacer 250 is clamped by abutment by the inner side end surface 262a of the annular portion 262 of each second spacer 260, the surface 252b being tapered so as to grow larger axially. As a result, no excessive thermal stress is caused, nor is the fitting margin changed.

Thus, a load applied to the shaft 210 is transmitted to the inner ring 220 first via the second spacers 260 and then via the first spacers 250, which allows the inner ring 220 to further transmit the load to the outer ring 230 through the balls 240 smoothly. The inner ring 220 will never be broken by the thermal stress during the use of the bearing.

In this embodiment, the angles of inclination $\theta_1$, $\theta_2$ of the respective clamping surfaces 252b, 262a of the pair of first spacers 250 and the pair of second spacers 260 formed with respect to the vertical sections, and the axial length $W_p$ at the center of the thickness between the surfaces 252b and between the surfaces 262a, and their diameter $D_p$ may be set so that the following relationship can be established.

$$\tan\theta_1 + \tan\theta_2 = 2W_p/D_p \qquad (1)$$

where $\theta_1$, $\theta_2$ take positive values when the tapered side end surfaces extend axially wider toward the outer periphery and negative values when they extend axially less toward the outer periphery.

By setting the angles and dimensions as described above, differences in the axial and radial displacements between the inner ring 220 and the first spacers 250 brought about by a change in the temperature between the time the bearing is used and the time it is mounted can be canceled out, allowing influence from the thermal stress caused on the clamping surfaces between the first spacers 250 and the second spacers 260 as well as on the fitting surfaces of the inner ring 220 and the first spacers 250 with respect to the shaft 210 to be eliminated surely.

The above equation (1) can be calculated as follows.

Assuming that $\Delta x_1$, $\Delta x_2$ and $\Delta y_1$, $\Delta y_2$ are the axial and radial displacements at the clamping surfaces 252b of the first spacers 250 with respect to the second spacers 260, respectively, caused by an increment of temperature $\Delta T$, the first spacers 250 clamping the inner ring 220 therebetween, then $$\Delta x_1 = (\alpha_s - \alpha_j)\cdot\Delta T\cdot(W_p - D_p \tan\theta_1)/2 \qquad (2a)$$

$$\Delta x_2 = (\alpha_s - \alpha_j)\cdot\Delta T\cdot(W_p - D_p \tan\theta_2)/2 \qquad (2b)$$

$$\Delta y_1 = (\alpha_s - \alpha_j)\cdot\Delta T\cdot(D_p - W_p \tan\theta_1)/2 \qquad (3a)$$

$$\Delta y_2 = (\alpha_s - \alpha_j)\cdot\Delta T\cdot(D_p - W_p \tan\theta_2)/2 \qquad (3b)$$

where $\alpha_s$, $\alpha_j$ are the linear expansion coefficient of the shaft 210 and that of the inner ring 220 and the first spacer 250, respectively.

Thus, as a condition that there are no differences between the temperature change-induced axial displacements and between the temperature change-induced radial displacements in the inner ring 220 and the first spacers 250, $$\Delta x_1 + \Delta x_2 = 0 \qquad (4a)$$

$$\Delta y_1 + \Delta y_2 = 0 \qquad (3b)$$

can be set, and with $\alpha_s = \alpha_j$, $\Delta T = 0$, equations (2a), (2b), (3a), (3b), (4a), (4b) can be solved to obtain equation (1).

Further, as described above, the linear expansion coefficient of the inner ring 220 and that of the first spacer 250 of the bearing are equal or substantially equal to each other, and the linear expansion coefficient of the shaft 210 and that of the second spacer 260 are equal or substantially equal to each other. However, the second spacer 260 may be made from a material so that its linear expansion coefficient from the inner peripheral portion contacting the shaft 210 to the outer peripheral portion contacting the first spacer 250 on the inner peripheral surface 261a of its cylindrical portion 261 changes continuously or gradually in a radial direction that is common with radial directions in which the linear expansion coefficients of the shaft 210 as well as of the inner ring 220 and the first spacer 250 change, respectively.

Such material includes a composite material (an inclinational material) prepared by mixing a ceramic and a metal in different ratios in the radial direction, or a material prepared by radially laminating at least two materials whose linear expansion coefficients are different from each other by bonding.

With the linear expansion coefficient of the second spacer 260 given the characteristic of changing in the radial direction as described above, the fitting margin of each second spacer 260 with respect to both the shaft 210 and the first spacer 250 is changed with a change in the temperature, and even if the fitting margin that has been increased by the change in the fitting margin of the inner ring 220 or the first spacers 250 with respect to the shaft 210 is directed to the second spacers 260, the increments of these fitting margins are absorbed by internal distortion corresponding to the directional characteristic of the linear expansion coefficient of the second spacer 260. As a result, breakage of the inner ring 220 due to change in the fitting margin can be prevented effectively.

Further, in the above embodiment, as for the dimensional relationship of the inner ring 220 and the first spacers 250 with respect to the shaft 210 and the second spacers 260, the inside and outside diameters may be determined in such a manner that the inner peripheral surface 221 of the inner ring 220 to be fitted onto the shaft 210 gets firmly fitted onto the outer peripheral surface 251b of the cylindrical portion 251 of each first spacer 250 to be fitted onto the corresponding second spacer 260 when the bearing is used at the latest, and that a load applied to the inner ring 220, a fitting stress, and a maximum tensile stress on the inner peripheral surface 221 of the inner ring 220 and the inner peripheral surface of each first spacer 250 and a maximum compression stress on the outer peripheral surface 222 of the inner ring 220 and the outer peripheral surface of each first spacer 250, both stresses caused by a temperature change-induced thermal stress, become smaller than the corresponding allowable maximum stresses of the materials constituting the inner ring 220 and the first spacers 250.

With the bearing constructed as described above, the load applied to the bearing is transmitted to the shaft 210 not only first via the first spacers 250 and then via the second spacers 260, but also via the inner peripheral surface 221 of the inner ring 220 and the inner peripheral surfaces of the first spacers 250. In addition, the load applied to the shaft 210 is similarly transmitted to the balls 240 and the outer ring 230 while borne by the inner ring 220, the first spacers 250, and the second spacers 260.

Accordingly, not only the load borne by the first spacers 250 and the second spacers 260 is reduced, but also the stress caused on the fitting surface (the outer peripheral surface 222) of the inner ring 220 with respect to each first spacer 250 is reduced, so that breakage of the inner ring 220 by the load applied thereto can surely be prevented.

Further, it may be so designed in the above embodiment that at least one of the first spacer 250 and the second spacer 260 supports the inner ring 220 with respect to the shaft 210 elastically in the radial direction.

As the elastically supporting structure by the first spacers 250 and the second spacers 250, it is desirable that their cylindrical portions 251, 261 be thin, that lightening portions be provided on the bottom base end corners of the cylindrical portions 251, 261, or that axially extending slits be provided at a predetermined interval in the circumferential direction. In the above cases, the first spacer 250 and the second spacer 260 may be made from an elastically deformable material, such as zirconia as a ceramic and a steel as a metal.

With the elastically supporting structure constructed as described above, when thermal stress and increments of the fitting margins are caused between the inner ring 220 and the first spacers 250 and between the first spacers 250 and the second spacers 260 consequent to a change in the temperature, the cylindrical portions 261, 271 of the first spacers 260 and the second spacers 260 are deformed elastically (expansion in the radial direction), thereby causing the thermal stress to be alleviated and the increments of the fitting margins to be absorbed. As a result, such elastic deformation plays a great role in preventing the inner ring 220 from breaking due to these causes.

The linear expansion coefficients of the inner ring 220 and the first spacer 250 as well as the linear expansion coefficients of the shaft 210 and the second spacer 260 may be selected so as to have appropriate differences from each other, so that temperature change-induced increments of the fitting margins produced by slight shape errors or dimensional errors of the fitting surfaces among the inner ring 220, the first spacers 250, the second spacers 260, and the shaft 210 can be canceled out.

Figure 7:
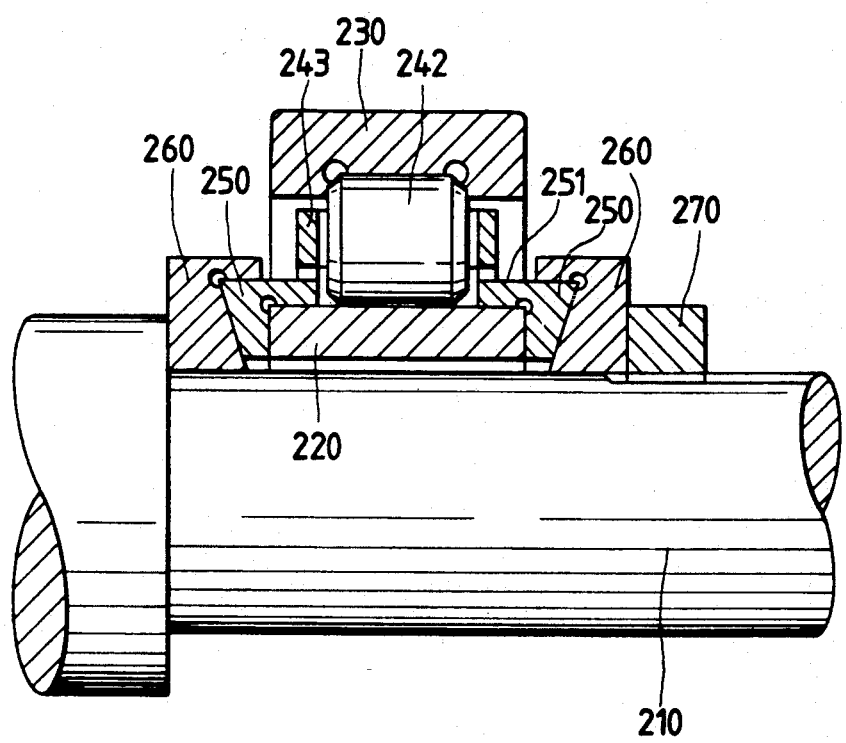
FIG. 7 is an upper half longitudinal sectional side view showing a sixth embodiment in which the invention is applied to a cylindrical roller bearing.

FIG. 7 shows a sixth embodiment in which the invention is applied to mounting an inner ring (an annular body) of a cylindrical roller bearing onto a shaft (a mating member). The cylindrical roller bearing shown in FIG. 7 includes an inner ring 220, an outer ring 230, and cylindrical rollers 242 placed by a cage 243 between the inner ring 220 and the outer ring 230.

While the construction of this embodiment that the inner ring 220 is assembled onto a shaft 210 by second spacers 260 through first spacers 250 is the same as that shown in FIG. 6, what distinguishes this embodiment from the latter is that an axial inner side end surface of a cylindrical portion 251 of each first spacer 250 extends up to a position at which to confront an end surface of the cylindrical roller 242 in such close proximity as to serve also as a guide collar for the cylindrical roller 242, and that the outer peripheral surface of the axial inner side end portion of each cylindrical portion 251 confronts the inner peripheral surface of the cage 243 in such close proximity as to serve also as a guide ring for the cage 243. It may be only one of these two functions that the cylindrical portion of each first spacer 250 is provided with.

Since other aspects of the construction than the above are the same as those shown in FIG. 6, the same components are designated as the same reference numerals and their description will be omitted.

While the case in which the ceramic inner ring is mounted onto the steel shaft has been described in the above embodiments, the application of the invention is not limited thereto; the invention may similarly be applied to a case in which a steel inner ring is mounted onto a shaft made from a material such as a stainless steel, brass, and an aluminum alloy.

Further, the invention is applied not only to a bearing in which the linear expansion coefficient of its inner ring is different from that of a shaft, but also to a bearing in which the linear expansion coefficient of its outer ring is different from that of a shaft.

Still further, the invention is applied not only to the case in which the temperature of a bearing gets higher when the bearing is used than when it is mounted; but also to a case in which the temperature gets lower when the bearing is used than when it is mounted.

Still further, the invention is applied to mounting annular bodies, which are components of not only roller bearings but also slide bearings and other devices onto mating members whose linear expansion coefficients are different.

As described in the foregoing pages, according to the invention, when the annular body is mounted onto its mating member whose linear expansion coefficient is different, a load applied to the annular body can be transmitted to the mating member through the first spacers fitted onto the annular body by clamping and the second spacers fitted onto the tapered surfaces of the first spacers by clamping. Therefore, even if a thermal stress and increments of the fitting margins among the annular body, the first spacers, the second spacers, and the mating member due to a change in temperature between the time the annular body is mounted and the time it is being used is produced, such stress and increments can be absorbed. As a result, the applied load can be transmitted effectively without breaking the annular body. In addition, since the axial side end surfaces of the annular body are vertical, the annular body can be machined easily and inexpensively. In the event that either the annular body or the first spacer is damaged, the advantage of replacing only the damaged part can additionally be provided.

Further, according to the invention, the fitting margin of the annular body with respect to its mating member can be made small, so that not only these components can be aligned easily, but also coaxial state of the annular body with respect to the mating member can be maintained highly accurately even during operation, so that a high performance of the mounted device can be maintained and the mounting device with a high reliability can thus be obtained.

What is claimed is:

1. A device for mounting an annular body being fitted onto the outer periphery or inner periphery of a mating member and having a linear expansion coefficient different from that of said mating member, said device comprising:
    a supporting means for supporting axial outer side end surfaces of said annular body, said supporting means including;
        a cylindrical portion having a peripheral surface fitted onto said axial side end portion of said outer peripheral surface of said annular body opposite to said peripheral surface thereof fitted onto said mating member, and
        an annular portion having an inner side end surface clamping a vertical axial side end surface of said annular body,
    in which said supporting means supports said annular body with respect to said mating member elastically in a radial direction.
    wherein said supporting means is made from a material whose radial linear expansion coefficient from a portion contacting said mating member to a portion contacting said annular body changes continuously or gradually in a radial direction common with radial directions in which radial linear expansion coefficients of said mating member and said annular body change, respectively.

2. A device for mounting an annular body according to claim 1, in which said supporting mean further comprising:
    a lightening portion provided on a bottom base end corner of said cylindrical portion.

3. A device for mounting an annular body according to claim 1, wherein said vertical axial side end surface of said annular body is inclined with respect to a line perpendicular to an axis of said mating member.

4. A device for mounting an annular body being fitted onto the outer periphery or inner periphery of a mating member and having a linear expansion coefficient different form that of said mating member, said device comprising:
    a supporting means for supporting axial outer side end surfaces of said annular body, said supporting means including;
        a cylindrical portion having a peripheral surface fitted onto said axial side end portion of said outer peripheral surface of said annular body opposite to said peripheral surface thereof fitted onto said mating member, and
        an annular portion having an inner side end surface clamping a vertical axial side end surface of said annular body,
    in which said supporting means supports said annular body with respect to said mating member elastically in a radial direction,
    wherein said supporting said supporting means further comprises a lightening portion provided on a bottom base end corner of said cylindrical portion.

5. A device for mounting an annular body being fitted onto the outer periphery or inner periphery of a mating member and having a linear expansion coefficient different from that of said mating member, said device comprising:
    a supporting means for supporting axial outer side end surfaces of said annular body, said supporting means including;
        a cylindrical portion having a peripheral surface fitted onto said axial side end portion of said outer peripheral surface of said annular body opposite to said peripheral surface thereof fitted onto said mating member, and
        an annular portion having an inner side end surface clamping a vertical axial side end surface of said annular body,
    in which said supporting means supports said annular body with respect to said mating member elastically in a radial direction,
    wherein said vertical axial side end surface of said annular body is inclined with respect to a line perpendicular to an axis of said mating member.

6. A device for mounting an annular body being fitted onto the outer periphery or inner periphery of a mating member and having a linear expansion coefficient different from that of said mating member, said device comprising:
    a supporting means for supporting axial outer side end surfaces of said annular body, said supporting means including;
        a cylindrical portion having a peripheral surface fitted onto said axial side end portion of said outer peripheral surface of said annular body opposite to said peripheral surface thereof fitted onto said mating member, and
        an annular portion having an inner side end surface clamping a vertical axial side end surface of said annular body,
    in which said supporting means supports said annular body with respect to said mating member elastically in a radial direction, wherein said supporting means consists of a pair of first spacers and a pair of said second spacers, said first spacers being made from a material having a linear expansion coefficient equal or substantially equal to that of said annular body, while said second spacers being made form a material having a linear expansion coefficient equal of substantially equal to that of said mating member.

7. A device for mounting an annular body according to claim 6, wherein said vertical axial side end surface of said annular body is inclined with respect to a line perpendicular to an axis of said mating member.

8. A device for mounting an annular body according to claim 6, wherein contacting surfaces between said first spacer and said second spacer is inclined with respect to a line perpendicular to an axis of said mating member.

9. A device for mounting an annular body according to claim 6, wherein said first spacers and said annular body are integrally coupled through a bonding means.

10. A device for mounting an annular body being fitted onto the outer periphery or inner periphery of a mating member and having a linear expansion coefficient different form that of said mating member, said device comprising:
   a supporting means for supporting axial outer side end surfaces of said annular body, said supporting means including;
      a cylindrical portion having a peripheral surface fitted onto said axial side end portion of said outer peripheral surface of said annular body opposite to said peripheral surface thereof fitted onto said mating member, and
      an annular portion having an inner side end surface clamping a vertical axial side end surface of said annular body,
   in which said supporting means supports said annular body with respect to said mating member elastically in a radial direction, wherein said supporting means consists of a pair of first spacers and a pair of said second spacers, and wherein said supporting means is made from a material having a radial linear expansion coefficient form a portion contacting said mating member to a portion contacting said annular body which changes continuously or gradually in a radial direction common with radial directions in which radial linear expansion coefficients of said mating member and said annular body change, respectively.

11. A device for mounting an annular body according to claim 10, wherein said vertical axial side end surface of said annular body is inclined with respect to a line perpendicular to an axis of said mating member.

12. A device for mounting an annular body according to claim 10, wherein contacting surfaces between said first spacer and said second spacer is inclined with respect to a line perpendicular to an axis of said mating member.

13. A device for mounting an annular body according to claim 10, wherein said first spacers and said annular body are made from the same material, and said first spacers and said annular body are integrally coupled through a bonding means.

14. A device for mounting an annular body being fitted onto the outer periphery or inner periphery of a mating member and having a linear expansion coefficient different from that of said mating member, said device comprising:
   a supporting means for supporting axial outer side end surfaces of said annular body, said supporting means including;
      a cylindrical portion having a peripheral surface fitted onto said axial side end portion of said outer peripheral surface of said annular body opposite to said peripheral surface thereof fitted onto said mating member, and
      an annular portion having an inner side end surface clamping a vertical axial side end surface of said annular body,
   in which said supporting means supports said annular body with respect to said mating member elastically in a radial direction, wherein said supporting means consists of a pair of first spacers and a pair of said second spacers, and wherein said vertical axial side end surface of said annular body is inclined with respect to a line perpendicular to an axis of said mating member.

15. A device for mounting an annular body being fitted onto the outer periphery or inner periphery of a mating member and having a linear expansion coefficient different form that of said mating member, said device comprising:
   a supporting means for supporting axial outer side end surfaces of said annular body, said supporting means including;
      a cylindrical portion having a peripheral surface fitted onto said axial side end portion of said outer peripheral surface of said annular body opposite to said peripheral surface thereof fitted onto said mating member, and
      an annular portion having an inner side end surface clamping a vertical axial side end surface of said annular body,
   in which said supporting means supports said annular body with respect to said mating member elastically in a radial direction, wherein said supporting means consists of a pair of first spacers and a pair or said second spacers, and wherein contacting surfaces between said first spacer and said second spacer are inclined with respect to a line perpendicular to an axis of said mating member.

16. A device for mounting an annular body being fitted onto the outer periphery or inner periphery of a mating member and having a linear expansion coefficient different from that of said mating member, said device comprising:
   a supporting means for supporting axial outer side end surfaces of said annular body, said supporting means including;
      a cylindrical portion having a peripheral surface fitted onto said axial side end portion of said outer peripheral surface of said annular body opposite to said peripheral surface thereof fitted onto said mating member, and
      an annular portion having an inner side end surface clamping a vertical axial side end surface of said annular body,
   in which said supporting means supports said annular body with respect to said mating member elastically in a radial direction, wherein said supporting means consists of a pair of first spacers and a pair of said second spacers, and wherein said first spacers and said annular body are made from the same material, and said first spacers and said annular body are integrally coupled through a bonding means.

* * * * *